(12) United States Patent
Franck

(10) Patent No.: US 9,338,150 B2
(45) Date of Patent: May 10, 2016

(54) CONTENT-CENTRIC NETWORKING

(71) Applicant: Alcatel Lucent, Boulogne Billancourt (FR)

(72) Inventor: Franck Franck, Dublin (IE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/371,689

(22) PCT Filed: Feb. 12, 2013

(86) PCT No.: PCT/EP2013/000405
§ 371 (c)(1),
(2) Date: Jul. 10, 2014

(87) PCT Pub. No.: WO2013/127492
PCT Pub. Date: Sep. 6, 2013

(65) Prior Publication Data
US 2015/0006896 A1   Jan. 1, 2015

(30) Foreign Application Priority Data

Feb. 28, 2012   (EP) .................................... 12360010

(51) Int. Cl.
*H04L 29/06*       (2006.01)
*H04L 9/32*        (2006.01)

(52) U.S. Cl.
CPC .......... *H04L 63/0457* (2013.01); *H04L 9/3242* (2013.01); *H04L 63/04* (2013.01); *H04L 63/061* (2013.01); *H04L 65/1069* (2013.01); *H04L 67/42* (2013.01)

(58) Field of Classification Search
CPC .................................................. H04L 63/0457
USPC ......................................................... 713/171
See application file for complete search history.

(56) References Cited

U.S. PATENT DOCUMENTS 7,136,932 B1   11/2006  Schneider
8,976,813 B2 *  3/2015  Bekiares et al. .............. 370/474
(Continued)

FOREIGN PATENT DOCUMENTS

EP   2120402   11/2009
EP   2416542    2/2012
(Continued)

OTHER PUBLICATIONS

Postel, J. Isi.; Domain Name System Structure and Delegation; rfc1591.txt; 19940301; Mar. 1, 1994; XP015007378; ISSN: 0000-0003; 8 pages.
(Continued)

*Primary Examiner* — Longbit Chai
(74) *Attorney, Agent, or Firm* — Patti & Malvone Law Group, LLC

(57) ABSTRACT

Methods of content-centric networking, a client, a server and a non-transitory computer-readable storage device storing a computer program product are disclosed. A method of establishing a secure session for transfer of a stream of data packets between a client and a server of a content-centric network is performed by exchanging information in such a way that the namespace of each data packet changes and is related to the previous data packets. The namespaces daisy-chain from one to the other, without the need for any additional authentication needing to take place between the two nodes when transferring a subsequent data packet. As long as both the client and the server derives the correct namespace for each subsequent data packet, it can be assumed that the session between the client and the server is still secure, which significantly improves performance while maintaining security.

15 Claims, 4 Drawing Sheets

(56) References Cited

U.S. PATENT DOCUMENTS

| | | | |
|---|---|---|---|
| 2005/0175184 A1* | 8/2005 | Grover et al. | 380/278 |
| 2011/0271007 A1 | 11/2011 | Wang et al. | |
| 2011/0320803 A1 | 12/2011 | Hampel et al. | |

FOREIGN PATENT DOCUMENTS

| | | |
|---|---|---|
| JP | 2002540739 | 11/2002 |
| JP | 2006344137 | 12/2006 |
| JP | 2009278624 | 11/2009 |
| JP | 2010178342 | 8/2010 |

OTHER PUBLICATIONS

Davides, D.W. et al; Security for Computer Networks; Japan, Nikkei-McGraw-Hill, Inc.; Dec. 5, 1985; First Edition and First Issue; pp. 126-129; Section 5.7; John Wiley & Sons Ltd.

Smetters, D. et al; Securing Network Content; parc A XeroX Company, [online], Oct. 2009, TR-2009-01, pp. 1-7, [retrieved on Sep. 14, 2015]. Retrieved from the Internet, URL, <https://www.parc.com/content/attachments/TR-2009-01.pdf>.

Jacobson, V. et al; Networking Named Content; Proceedings of the 5th International Conference on Emerging Networking Experiments and Technologies (CoNEXT '09); Dec. 1, 2009, Rome, Italy; pp. 1-12.

* cited by examiner

CONTENT-CENTRIC NETWORKING

FIELD OF THE INVENTION

The present invention relates to methods of content-centric networking, a client, a server and computer program products.

BACKGROUND

Content-centric networking is known. In such content-centric networking, a routing paradigm is provided for delivery of content in a data network. In particular, requests for content are made to network nodes within the content-centric network and, if a network node receiving that request has a local copy of that content, then this is routed back to the requesting node. However, if a network node does not have that content, then the request is promulgated through the network until the content is returned or, if no content is returned, an error message is provided to the requesting node. Typically, as the content is passed back to the requesting node, a copy of that content may be stored locally by network nodes in order that they have that content accessible, should a subsequent request for that content be made.

Although such an approach enables content to be provided, this is not without its own shortcomings.

Accordingly, it is desired to provide an improved technique for content-centric networking.

SUMMARY

According to a first aspect, there is provided a method of establishing a secure session for transfer of a stream of data packets between a client and a server of a content-centric network, the method comprising the steps of: exchanging a first namespace portion indication between the server and the client; deriving a first namespace portion from the first namespace portion indication; incorporating the first namespace portion into a first namespace of a first request from the client to the server for a first data packet of the stream of data packets; deriving a subsequent namespace portion, the subsequent namespace portion being based on transfer of the first data packet, the subsequent namespace portion differing from the first namespace portion; and incorporating the subsequent namespace portion into a subsequent namespace of a subsequent request from the client to the server for a subsequent data packet of the stream of data packets.

The first aspect recognises that a problem with existing content-centric networking approaches is that although they typically have a strong emphasis on security, this typically requires all network packets to be signed using a public key infrastructure encryption system. Whilst this allows the network to verify the origin of every packet, this impacts on performance as asymmetric encryption is very slow.

To alleviate this, the first aspect recognises that performance improvements can be achieved by implementing secure sessions in a content-centric network, a secure session being transfer of a stream of data packets between two network nodes where authentication is performed once, at the beginning of the session, and thus the individual data packets need not be signed.

When establishing a secure session within a content-centric network, the communicating parties typically need to agree on a namespace where they can exchange information. At the server end, this namespace serves to identify an incoming packet as belonging to a given session. Knowing which session an incoming packet belongs to typically allows the server to retrieve the cryptographic key needed to decrypt the data packet.

By using a key that is shared only with a single client, the server can then implicitly verify the identity of the sender as being the only other network node with access to the key. Other than serving as such an identifier of the secure session, the specific format of the namespace thus has no direct correlation with the data being exchanged and may be chosen based on any number of different principles.

By using the namespace selection techniques described below, several advantages over other namespace selection schemes can be achieved, including de-correlation of related session traffic and elimination of any chance to perform replay attacks on the session established mechanisms.

Accordingly, a method of establishing a secure session between a client and a server is provided. A first namespace portion indication may be exchanged between the client and server. The first namespace portion may be derived from the indication. The first namespace portion may be incorporated into a first namespace associated with a request from the client for a first data packet from the server. A subsequent namespace portion may then be derived which differs from the first namespace portion. The subsequent namespace portion may then be incorporated into a subsequent request for a subsequent data packet from the server.

Hence, the namespace associated with the first data packet may be determined between the client and the server. A namespace associated with a subsequent data packet may then be derived by the client and server following the transfer of the first data packet. In this way, the namespace of each data packet changes and is related to the previous data packets such that the namespaces daisy-chain from one to the other, without the need for any additional authentication needing to take place between the two nodes when transferring a subsequent data packet. Instead, the namespace for each subsequent data packet may be derived based on the preceding data packet. As long as both the client and the server derives the correct namespace for each subsequent data packet, it can be assumed that the session between the client and the server is still secure, which significantly improves performance whilst maintaining security. Also, because the namespace changes for each data packet in what will appear to be a largely random way, this makes it difficult for intercepting nodes to determine that the data packets being transferred over the content-centric network are related, and because each subsequent data packet is only allocated a namespace following transmission of a preceding data packet this makes it difficult for third parties to access the data stream or run replay attacks.

In one embodiment, the first namespace portion indication comprises an encryption key shared by the client and the server and the first namespace portion is derived from the encryption key. Accordingly, an encryption key may be shared by the server and client, which is possible to do using known techniques without the key being 'in the open' (i.e. disclosed in or readily derivable from insecure communication). The first namespace portion may then be derived by both the client and server from this secure encryption key.

In one embodiment, the first namespace portion indication comprises an encryption key shared by the client and the server and the first namespace portion is derived from a hash function shared by the client and the server which is applied to the encryption key. Accordingly, rather than simply deriving the namespace portion from the encryption key itself, a hash function may also be utilised to further complicate the derivation of the first namespace portion, which is derived by applying the hash function to the encryption key. It will be appreciated that the sharing of the hash function may be achieved in a similar way to the sharing of the encryption key in order to ensure that the hash function is not in the open.

In one embodiment, the first namespace portion indication comprises the first namespace portion encrypted by an encryption key shared by the client and the server, and the first namespace portion is derived by decrypting the first namespace portion indication using the encryption key. Accordingly, the first namespace portion may be transmitted in encrypted form between the server and client, each being able to derive the namespace portion by decryption using the encryption key.

In one embodiment, the subsequent namespace portion indication comprises the first data packet encrypted by an encryption key shared by the client and the server and the subsequent namespace portion is derived from the first data packet. Accordingly, the subsequent namespace portion may be derived by decrypting the first data packet.

In one embodiment, the subsequent namespace portion is derived from the first data packet by decrypting the first data packet using the encryption key. Hence, the subsequent namespace portion may be encoded by the first data packet and encrypted. To derive the subsequent namespace portion, the data packet is decrypted and decoded to reveal the subsequent namespace portion. This helps to provide assurance within the secure session, since the derivation of the subsequent namespace needs to be based on correctly receiving and decoding the preceding data packet. As long as each preceding data packet is correctly received, decrypted and decoded, the namespace of the following data packet is derivable. Also, it is possible to imply that the secure session has not been compromised or interrupted whilst requests to each subsequent namespace continue to occur.

In one embodiment, the subsequent namespace portion is derived from a hash function applied to the first data packet. Again, by utilising a hash function, the integrity of the subsequent namespace portion is increased.

In one embodiment, the subsequent namespace portion is derived from a hash function applied to the first data packet and the first namespace portion. Again, by utilising a hash function, the integrity of the subsequent namespace portion is increased.

In one embodiment, the first namespace portion comprises one of a random value and a selected value in a sequence of pseudorandom values. By deriving a first namespace portion based on a random value derived from the indication exchanged between the server and the client, the namespace associated with the first data packet is difficult to predict. Likewise, deriving the first namespace portion from a selected value in a pseudo-random sequence which may be derived from the indication exchanged between the server and the client, again the initial namespace may be derivable only by the client and server, thereby enabling a secure session. It will be appreciated that in one embodiment it is possible to provide a predictable pseudorandom number generator by using an encryption function E and key k previously exchanged. If a starting point x is agreed and this is encrypted iteratively, it will evolve from $E\_k(x)$ to $E\_k(E\_k(x))$ to $E\_k(E\_k(E\_k(x)))$ and so on, which looks entirely random when E, k, and x are unknown. Likewise, instead of $E\_k(\ )$, a hashing function could be used. The starting point x could be anything, for example the key k itself. In one embodiment, the subsequent namespace portion comprises one of another random value and another selected value in the sequence of pseudorandom values. Accordingly, the subsequent namespace portion may be another random value. This random value may be based on or derived from the transfer of the first data packet. For example, the random value may be incorporated into the first data packet or may be, for example, a particular set of bits within that data packet. Hence, the subsequent namespace portion may be derived from that previous data packet. Alternatively, the subsequent namespace portion may be another selected value in the sequence of pseudo-random values. Again, this may be a pre-agreed offset in the sequence of pseudo-random values or may be indicated by the previous data packet. Again, this provides for the establishment of a secure session and makes it difficult for a third party to predict the next namespace for the secure session.

In one embodiment, the method comprises the steps of deriving subsequent namespace portions, the subsequent namespace portions differing from preceding namespace portions; and incorporating the subsequent namespace portions into a subsequent namespace of subsequent requests from the client to the server for subsequent data packets of the stream of data packets. Accordingly, the namespace associated with each subsequent request may be based on a preceding data packet, each of those namespace portions differing from the preceding namespace portion in order to improve the integrity of the secure session.

In one embodiment, each namespace of a request for a data packet of the stream of data packets comprises at least one of a content provider identifier, a secure session identifier comprising the namespace portion and a content identifier. Accordingly, the namespace may comprise a content provider identifier, a secure session identifier comprising the namespace portion, or a content identifier.

In one embodiment, the method comprises the step of, for namespaces of requests for subsequent data packets of the stream of data packets whose content identifier does not vary, applying a salt function shared by the client and the server to the content identifier to increase its variability. Accordingly, salting procedures may be applied to the requests or to portions of the requests in order to increase the variability of the values incorporated into the namespace. Typically, this may be applied to the content identifier in order to reduce the probability that a third party may be able to correlate the different requests as being associated with a session for transferring a sequence of data packets relating to some content.

According to a second aspect, there is provided a client operable to establish a secure session for transfer of a stream of data packets between a server and the client of a content-centric network, the client comprising: exchanging logic operable to exchange a first namespace portion indication between the server and the client; deriving logic operable to derive a first namespace portion from the first namespace portion indication and to incorporate the first namespace portion into a first namespace of a first request to the server for a first data packet of the stream of data packets, the deriving logic being further operable to derive a subsequent namespace portion, the subsequent namespace portion being based on transfer of the first data packet, the subsequent namespace portion differing from the first namespace portion and to incorporate the subsequent namespace portion into a subsequent namespace of a subsequent request to the server for a subsequent data packet of the stream of data packets.

In one embodiment, the first namespace portion indication comprises an encryption key shared by the client and the server and the deriving logic operable to derive the first namespace portion from the encryption key.

In one embodiment, the first namespace portion indication comprises an encryption key shared by the client and the server and the deriving logic operable to derive the first namespace portion from a hash function shared by the client and the server which is applied to the encryption key.

In one embodiment, the first namespace portion indication comprises the first namespace portion encrypted by an encryption key shared by the client and the server, and the deriving logic operable to derive the first namespace portion by decrypting the first namespace portion indication using the encryption key.

In one embodiment, the subsequent namespace portion indication comprises the first data packet encrypted by an encryption key shared by the client and the server and the deriving logic operable to derive the subsequent namespace portion from the first data packet.

In one embodiment, the deriving logic operable to derive the subsequent namespace portion from the first data packet by decrypting the first data packet using an encryption key.

In one embodiment, the deriving logic operable to derive the subsequent namespace portion from a hash function applied to the first data packet.

In one embodiment, the deriving logic operable to derive the subsequent namespace portion from a hash function applied to the first data packet and the first namespace portion.

In one embodiment, the first namespace portion comprises one of a random value and a selected value in a sequence of pseudorandom values.

In one embodiment, the subsequent namespace portion comprises one of another random value and another selected value in the sequence of pseudorandom values.

In one embodiment, the deriving logic operable to derive subsequent namespace portions, the subsequent namespace portions differing from preceding namespace portions and to incorporate the subsequent namespace portions into a subsequent namespace of subsequent requests from the client to the server for subsequent data packets of the stream of data packets.

In one embodiment, each namespace of a request for a data packet of the stream of data packets comprises at least one of a content provider identifier, a secure session identifier comprising the namespace portion and a content identifier.

In one embodiment, the deriving logic operable, for namespaces of requests for subsequent data packets of the stream of data packets whose content identifier does not vary, to apply a salt function shared by the client and the server to the content identifier to increase its variability.

According to a third aspect, there is provided a method of establishing a secure session for transfer of a stream of data packets between a server and a client of a content-centric network, the method comprising the steps of: exchanging a first namespace portion indication between the server and the client; deriving a first namespace portion from the first namespace portion indication; incorporating the first namespace portion into a first namespace associated with a first data packet of the stream of data packets; deriving a subsequent namespace portion, the subsequent namespace portion being based on transfer of the first data packet, the subsequent namespace portion differing from the first namespace portion; and incorporating the subsequent namespace portion into a subsequent namespace associated with a subsequent data packet of the stream of data packets.

In one embodiment, the first namespace portion indication comprises an encryption key shared by the client and the server and the first namespace portion is derived from the encryption key.

In one embodiment, the first namespace portion indication comprises an encryption key shared by the client and the server and the first namespace portion is derived from a hash function shared by the client and the server which is applied to the encryption key.

In one embodiment, the first namespace portion indication comprises the first namespace portion encrypted by an encryption key shared by the client and the server, and the first namespace portion is derived by decrypting the first namespace portion indication using the encryption key.

In one embodiment, the subsequent namespace portion indication comprises the first data packet encrypted by an encryption key shared by the client and the server and the subsequent namespace portion is derived from the first data packet.

In one embodiment, the subsequent namespace portion is derived from the first data packet by decrypting the first data packet using an encryption key.

In one embodiment, the subsequent namespace portion is derived from a hash function applied to the first data packet.

In one embodiment, the subsequent namespace portion is derived from a hash function applied to the first data packet and the first namespace portion.

In one embodiment, the first namespace portion comprises one of a random value and a selected value in a sequence of pseudorandom values.

In one embodiment, the subsequent namespace portion comprises one of another random value and another selected value in the sequence of pseudorandom values.

In one embodiment, the method comprises the steps of deriving subsequent namespace portions, the subsequent namespace portions differing from preceding namespace portions; and incorporating the subsequent namespace portions into subsequent namespaces associated with subsequent data packets of the stream of data packets.

In one embodiment, each namespace of a request for a data packet of the stream of data packets comprises at least one of a content provider identifier, a secure session identifier comprising the namespace portion and a content identifier.

In one embodiment, the method comprises the step of applying a salt function shared by the client and the requests for data packets of the stream of data packets.

According to a fourth aspect, there is provided a server operable to establish a secure session for transfer of a stream of data packets between a server and a client of a content-centric network, the server comprising: exchanging logic operable to exchange a first namespace portion indication between the server and the client; deriving logic operable to derive a first namespace portion from the first namespace portion indication; incorporating logic operable to incorporate the first namespace portion into a first namespace associated with a first data packet of the stream of data packets; the deriving logic being operable to derive a subsequent namespace portion, the subsequent namespace portion being based on transfer of the first data packet, the subsequent namespace portion differing from the first namespace portion; and the incorporating logic being operable to incorporate the subsequent namespace portion into a subsequent namespace associated with a subsequent data packet of the stream of data packets.

In one embodiment, the first namespace portion indication comprises an encryption key shared by the client and the server and the deriving logic being operable to derive the first namespace portion from the encryption key.

In one embodiment, the first namespace portion indication comprises an encryption key shared by the client and the server and the deriving logic being operable to derive the first namespace portion from a hash function shared by the client and the server which is applied to the encryption key.

In one embodiment, the first namespace portion indication comprises the first namespace portion encrypted by an encryption key shared by the client and the server, and the deriving logic being operable to derive the first namespace portion by decrypting the first namespace portion indication using the encryption key.

In one embodiment, the subsequent namespace portion indication comprises the first data packet encrypted by an encryption key shared by the client and the server and the deriving logic being operable to derive the subsequent namespace portion from the first data packet.

In one embodiment, the deriving logic being operable to derive the subsequent namespace portion from the first data packet by decrypting the first data packet using an encryption key.

In one embodiment, the deriving logic being operable to derive the subsequent namespace portion from a hash function applied to the first data packet.

In one embodiment, the deriving logic being operable to derive the subsequent namespace portion from a hash function applied to the first data packet and the first namespace portion.

In one embodiment, the first namespace portion comprises one of a random value and a selected value in a sequence of pseudorandom values.

In one embodiment, the subsequent namespace portion comprises one of another random value and another selected value in the sequence of pseudorandom values.

In one embodiment, the deriving logic is operable to derive subsequent namespace portions, the subsequent namespace portions differing from preceding namespace portions; and the incorporating logic is operable to incorporate the subsequent namespace portions into subsequent namespaces associated with subsequent data packets of the stream of data packets.

In one embodiment, each namespace of a request for a data packet of the stream of data packets comprises at least one of a content provider identifier, a secure session identifier comprising the namespace portion and a content identifier.

In one embodiment, the server comprises salting logic operable to apply a salt function shared by the client and the requests for data packets of the stream of data packets.

According to a fifth aspect, there is provided a computer program product operable, when executed on a computer, to perform the method steps of the first or third aspect.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which.

DESCRIPTION OF THE EMBODIMENTS

Overview

Before discussing embodiments in any more detail, first an overview will be provided. A technique is provided for establishing a secure session between a client and a content provider in a content-centric network.

Figure 1:
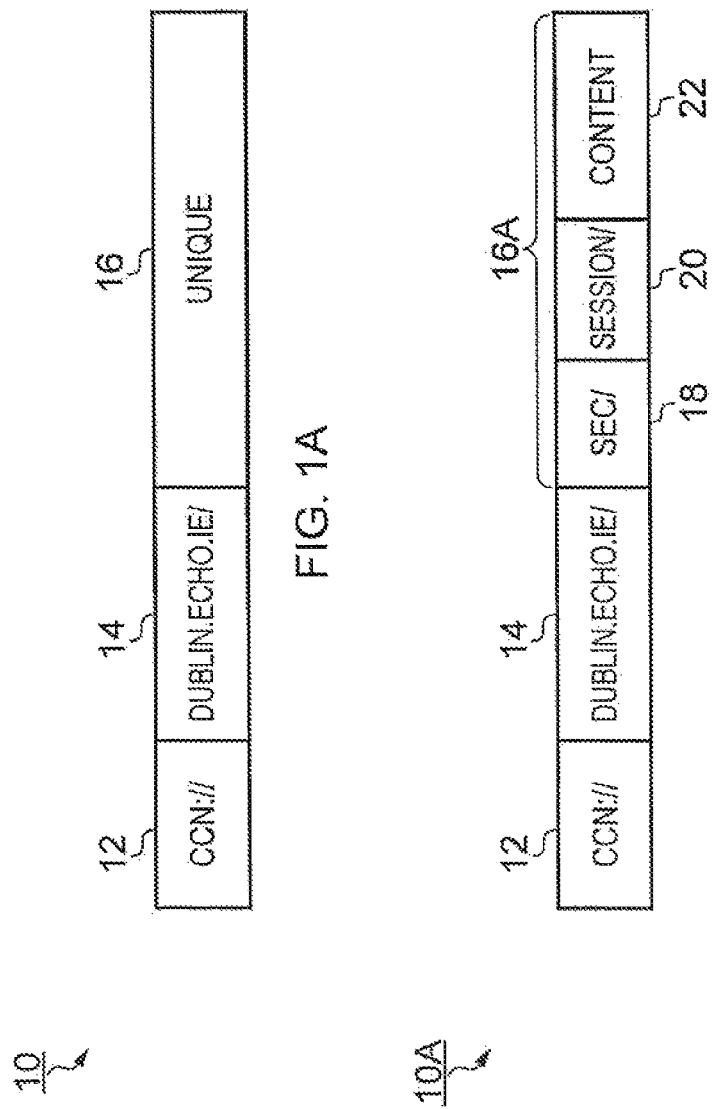
FIGS. 1A & 1B illustrate a namespace according to embodiments.

Typically, a client of a content-centric network will seek to access content for content by issuing a request in the form of an "interest packet" to a "namespace", as illustrated in FIG. 1A. Although the exact format of the namespace may vary, generally the namespace will first include a protocol portion 12 identifying a content-centric network protocol. A content provider portion 14 is provided which typically identifies the source of the content. Finally, a content identifier portion 16 is provided which uniquely identifies the content itself.

When an interest packet is received, the receiving network node in the content-centric network will look at the namespace associated with that interest packet and determine whether it has a locally stored copy of that content. If not, then various mechanisms exist for propagating the interest packet throughout the content-centric network.

When a network node having the content receives the interest packet then the content is provided back across the content-centric network as a data packet to the requesting client and any network nodes which receive that content can make an assessment on whether they wish to store a copy of that content in their local cache.

In order to improve the security of any data transfers across the content-centric network, an augmented namespace arrangement 10a is utilised, as shown in FIG. 1B. In this arrangement, a content identifier 16a is provided which includes a number of portions. A first portion 18 identifies that the namespace is associated with a secure or reserved namespace. A session identifier portion 20 is provided which, as mentioned below, changes with each data packet transferred. A further portion 22 is provided which uniquely identifies the content requested.

The value of the session identifier portion 20 changes with each interest packet sent within a session. The value of the session identifier portion 20 of each interest packet is only known to the requesting client and the content provider. Also, the value of the session identifier portion 20 is likely to be different even when the same content is requested from a server by the client at a different time. This improves the security of the delivery of content since the namespace associated with that content varies and is only known to the content provider and a trusted recipient. Also, the namespace of each subsequent portion of the content varies and is only created as interest packet requesting that content is created. This makes it extremely difficult for third parties to access content and, even if they are able to access a portion of the content, it is difficult for them to access the next portion of that content. Furthermore, because of the nature of the changing namespace, even if content was intercepted it is difficult to identify whether the content portions relate to each other since there is typically no obvious indication in the namespace of any relationship between the different portions of content. This, therefore, effectively provides for a secure mechanism for point to point transfer of content in a content-centric network. Any content which is stored locally by network nodes within their cache will eventually be discarded as they will not be requested again.

Content-Centric Network

Figure 2:
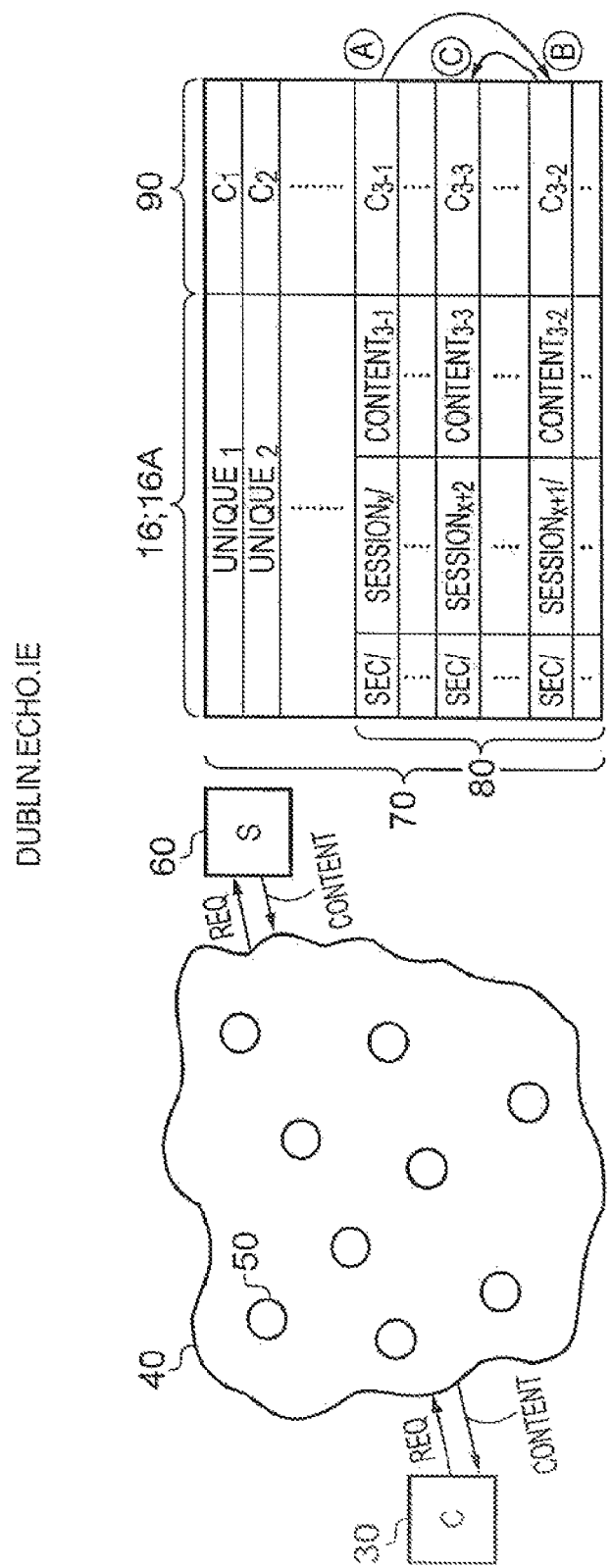
FIG. 2 illustrates a content-centric network according to one embodiment.

FIG. 2 illustrates a content-centric network according to one embodiment. A client 30 is connected to the content-centric network 40 made of a number of interconnected network nodes 50. Also connected to the content-centric network 40 is a server 60 associated with a content provider which provides content to the content-centric network in response to interest packets received for that content.

As mentioned above, when the client 30 requests content from the content-centric network 40, the client 30 does this by issuing an interest packet for the content associated with a particular namespace, as illustrated in FIGS. 1A and 1B. Should any of the network nodes 40 have in their local cache the content associated with that namespace, then the content is provided to the client 30 as a data packet.

If none of the network nodes 50 have content associated with the namespace in the interest packet, then eventually the interest packet will propagate to the server 60 which is associated with the content provider set out in the content provider portion 14 of the namespace.

The server 60 will then examine its namespace 70 to determine whether it has content available associated with that namespace. In the event that the server 60 identifies that the content identifier portion 16; 16a matches an entry in its namespace 70, then the associated content 90 is provided as a data packet. In the event that the portion 16, 16a does not match any entry in the namespace 70, then no content is provided and an error message may optionally be sent.

Reserved Namespace

A reserved portion 80 of the namespace 70 is provided which is utilised to support a secure session between a client 30 and the server 60. In particular, entries within this reserved portion 80 of the namespace 70 are dynamically utilised to support data transfer within the secure session. In particular, an entry is made within the secure portion 80 when an interest packet for content is issued by the client 30 and that entry is associated with the requested content.

However, the namespace entry is unique and is only utilised in response to a request for specific content during a secure session. As will be explained in more detail below, this namespace should only be known to the client 30 and the server 60 and should not be derivable by any other network node. Furthermore, this namespace should differ each time the request for content is made, even if the request comes from the same client and relates to the same content from the same content provider.

The content will typically be requested using a sequence of interest packets and the namespace associated with each interest packet within the session will vary and will only be known to the client 30 and server 60. Hence, to an external observer, the content provided will appear to relate to completely different namespaces and so will appear uncorrelated. Although it may be possible to deduce the order of the content from the order of transmission, changing the namespaces helps to camouflage which packets belong to the same session. This would make it very difficult for the content to be reassembled in the correct order. Also, given that the content will typically only be associated with the namespace until it has been requested, the same content is unlikely to be available at that namespace should another network node attempt to replay the request in a spoof attack on the server 60 by reissuing the interest packets. In addition, it will typically be the case that each additional namespace allocated for a subsequent portion of the content is derived from information associated with the previous interest packet and/or the provided content which effectively provides a daisy-chain relationship between the namespaces associated with subsequent content portions.

Consider the following example where a secure session is established for the transfer of three portions of content $C_{3-1}$, $C_{3-2}$ and $C_{3-3}$ from the server 60 in response to requests from the client 30.

As shown in FIG. 2, an interest packet for a first portion of content $C_{3-1}$ is addressed to the reserved namespace 80, as shown in A. As will be explained in more detail below, the session identifier portion 20 has a value of $session_x$, which will be known only to both the client 30 and the server 60. It will be appreciated that the value of $session_x$ may be any value within the reserved namespace 80.

After receipt of the content $C_{3-1}$, the next namespace (in particular the value of $session_{x+1}$) is calculated by the server 60 and this next namespace is associated with content $C_{3-2}$.

The value of $session_{x+1}$ is also determined by the client 30 and the next interest packet for content $C_{3-2}$ is addressed to the namespace as shown in B.

After providing the content $C_{3-2}$, the server 60 then determines the namespace (in particular the value of $session_{x+2}$) associated with content $C_{3-3}$ and associates content $C_{3-3}$ with that namespace.

The client 30 also determines the namespace for content $C_{3-3}$ (by determining the value of $session_{x+2}$) and makes a request to that namespace. Accordingly, sequential portions of content within a session can be provided to the client 30 from the server 60.

Secure Session

Figure 3:
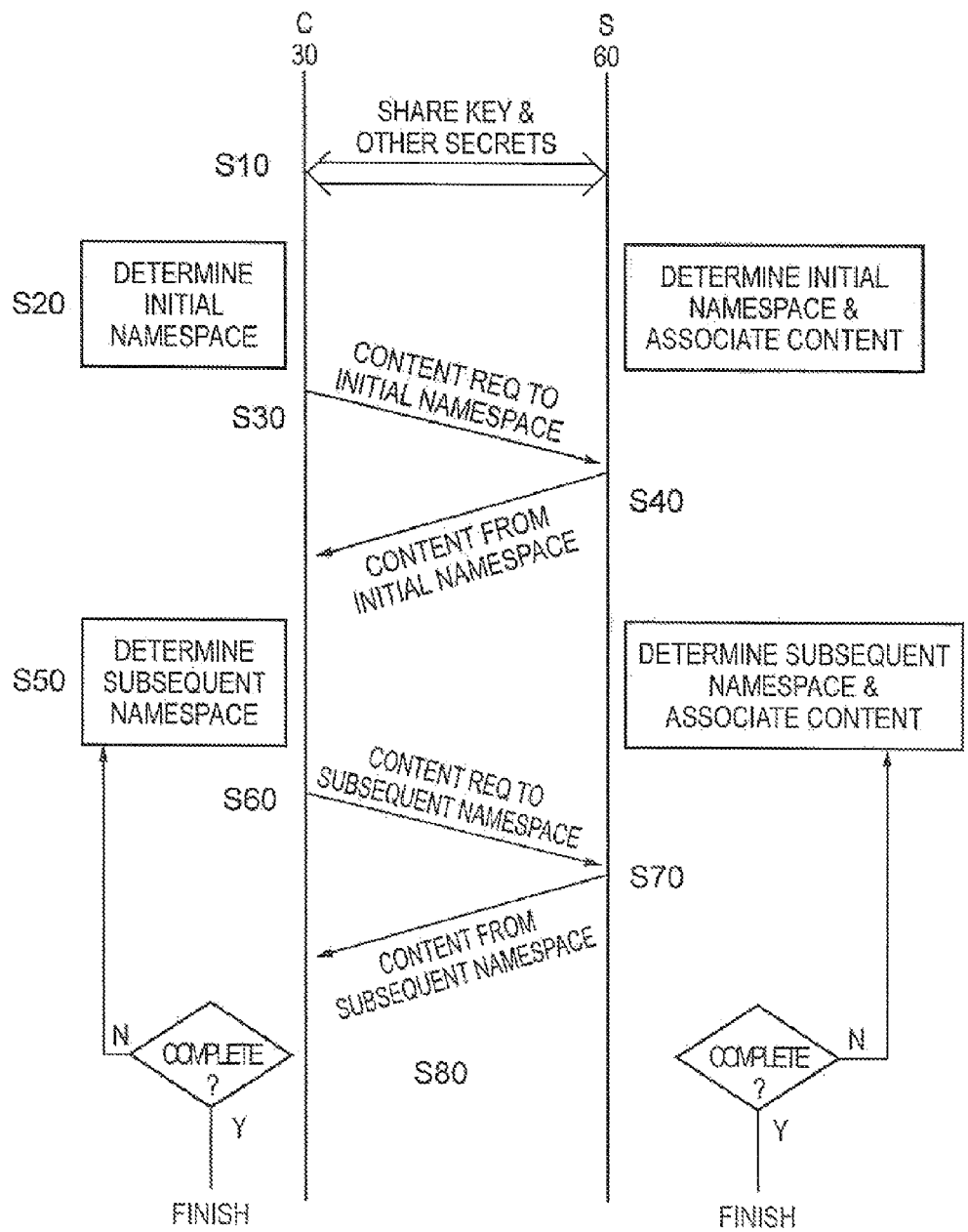
FIG. 3 illustrates the main messaging and processing steps when establishing and transferring content in a secure session over the content-centric network according to one embodiment.

FIG. 3 illustrates the main messaging and processing steps performed by the client 30 and the server 60 when establishing and transferring content in a secure session over the content-centric network 40 to request, for example, three portions of content $C_{3-1}$, $C_{3-2}$ and $C_{3-3}$.

At step S10, in response to a request from the client 30 for content from the server 60, a key K1 is exchanged between the client 30 and the server 60 in accordance with known techniques such as, for example, a Diffie-Hellman key exchange.

Optionally, the client 30 and the server 60 may exchange other information either encrypted using the encryption key K1 or through open exchange. For example, details of one or more hash functions which may be used subsequently may be exchanged. Likewise, an indication of an initial value session of the session portion 20 may be exchanged. This initial value of the session portion 20 may be selected by the client 30 or by the server 60 and provided to the other. This initial value of the session portion 20 may be provided in the open or may be encrypted using the key K1. Alternatively, the initial value of the session portion 20 could be encrypted by the key K1 and have a hash function applied. Alternatively, the initial value of the session portion 20 could be determined by applying a hash function to the key K1. Alternatively, the initial value of the session portion 20 could be determined using a pointer to an initial entry in a pseudorandom sequence known to both the client 30 and server 60 may be sent in the open, may be encrypted with or without a hash function being applied.

At step S20, both the client 30 and the server 60 perform the same operation to determine the initial value session of the session portion 20 and, hence, the initial namespace. Alternatively, the server 60 need do nothing if the client 30 has supplied the initial value of the session portion 20 of the namespace. For example, the initial value of the session portion 20 of the namespace may be extracted from an open message transferred between the client 30 and the server 60. Alternatively, the initial value of the session portion 20 of the namespace may be determined by applying the key K1 to information exchanged between the client 30 and the server 60. Alternatively, the initial value of the session portion 20 of the namespace may be determined by applying a hash function and the key K1 to information exchanged between the client 30 and the server 60. Alternatively, the initial value of the session portion 20 the initial namespace may be determined by applying a hash function to the key K1. Alternatively, the initial value of the session portion 20 may be determined from the initial entry in the pseudorandom sequence.

Once the server 60 has determined the initial namespace, the required content is then associated with that namespace within the reserved namespace 80 of the namespace 70. For example, the server 60 may associate the content $C_{3-1}$ with the initial namespace shown at A in FIG. 2.

At step S30, the client 30 sends an interest packet for content $C_{3-1}$ to the content-centric network 40 using the same initial namespace shown at A in FIG. 2.

At step S40, the server 60 receives the interest packet and looks within its namespace for an entry which has associated content. If no such entry exists or if no content is associated with that entry, then either no further action is taken or an error message is provided. However, if the initial namespace matches an entry in the reserved portion 70 of the namespace 80 then the associated content $C_{3-1}$ is provided by the server 60 to the client 30 in a data packet.

At step S50, the client 30 and the server 60 both determine the subsequent namespace for the next portion of the content $C_{3-2}$. In particular, both the client 30 and the server 60 perform the same operation to determine the next value of the session portion 20 $session_{x+1}$. This determination can be made in a number of ways. For example, the next value of the session portion 20 could be derived from another value in the pseudo-random sequence which may be either a pre-agreed offset from the previous value in the sequence, or may be based on an offset derived from the content provided at step S40. Likewise, the next value of the session portion 20 may be derived from applying the key K1 to the content received at S40. Alternatively, the next value of the session portion 20 may be derived by applying a hash function to the content provided at step S40. Alternatively, the next value of the session portion 20 may be derived by applying a key or hash function to the previous portion of the namespace.

Meanwhile, the server S60 makes an entry in its reserved portion 80 of the namespace 70 and associates the next portion of data $C_{3-2}$ with that entry, as shown in at B in FIG. 2.

At step S60, the client 30 sends an interest packet for content $C_{3-2}$ to the content-centric network 40 using the same initial namespace shown at B in FIG. 2.

At step S70, the server 60 receives the interest packet and looks within its namespace for an entry which has associated content. If no such entry exists or if no content is associated with that entry, then either no further action is taken or an error message is provided. However, if the initial namespace matches an entry in the reserved portion 70 of the namespace 80 then the associated content $C_{3-2}$ is provided by the server 60 to the client 30 in a data packet.

At step S80, a determination is made of whether the session has completed. If so, then processing finishes. If not, then processing returns to step S50 and the determination of the next value of the session portion 20 is then made based on the preceding namespace and/or the preceding portion of content received, as illustrated at C in FIG. 2.

Accordingly, it can be seen that a technique is provided for use in a content-centric network. Such content-centric networks have a strong emphasis on security and typically require all network packets to be signed using a public key infrastructure (PKI) encryption system. Whilst this allows the network to verify the origins of every packet, it significantly affects performance as asymmetric encryption is very slow. To alleviate this, embodiments provide for secure sessions in a content-centric network, a session being a stream of data between two network nodes where authentication is performed once, at the beginning of a session, and thus individual packets need not be signed.

When establishing a secure session within a content-centric network, the communicating parties need to agree on a namespace where they can exchange information. At the server end, this namespace serves to identify incoming data as belonging to a given session. Knowing which session an incoming packet belongs to allows the server to retrieve the cryptographic key needed to decrypt the packet. By using a key that is shared only with a single client, the server can then implicitly verify the identity of the sender as being the only other node with access to the key. Other than serving as such an identifier of the session, the specific value of the namespace thus has no direct correlation with the data being exchanged and may be chosen based on any number of different principles. By using the namespace selection principles outlined, it is possible to achieve many advantages over other namespace selection schemes, including de-correlation of related session traffic and elimination of any chance to perform replay attacks on session establishment mechanisms.

By agreeing on a shared secret, such as a symmetric encryption key, two nodes in a content-centric network can establish a session which is a stream of data understandable only by the two hosts. In those embodiments which use a secure hash function, an additional security layer is provided within sessions by continually varying the namespace that the end points use to communicate.

Figure 4:
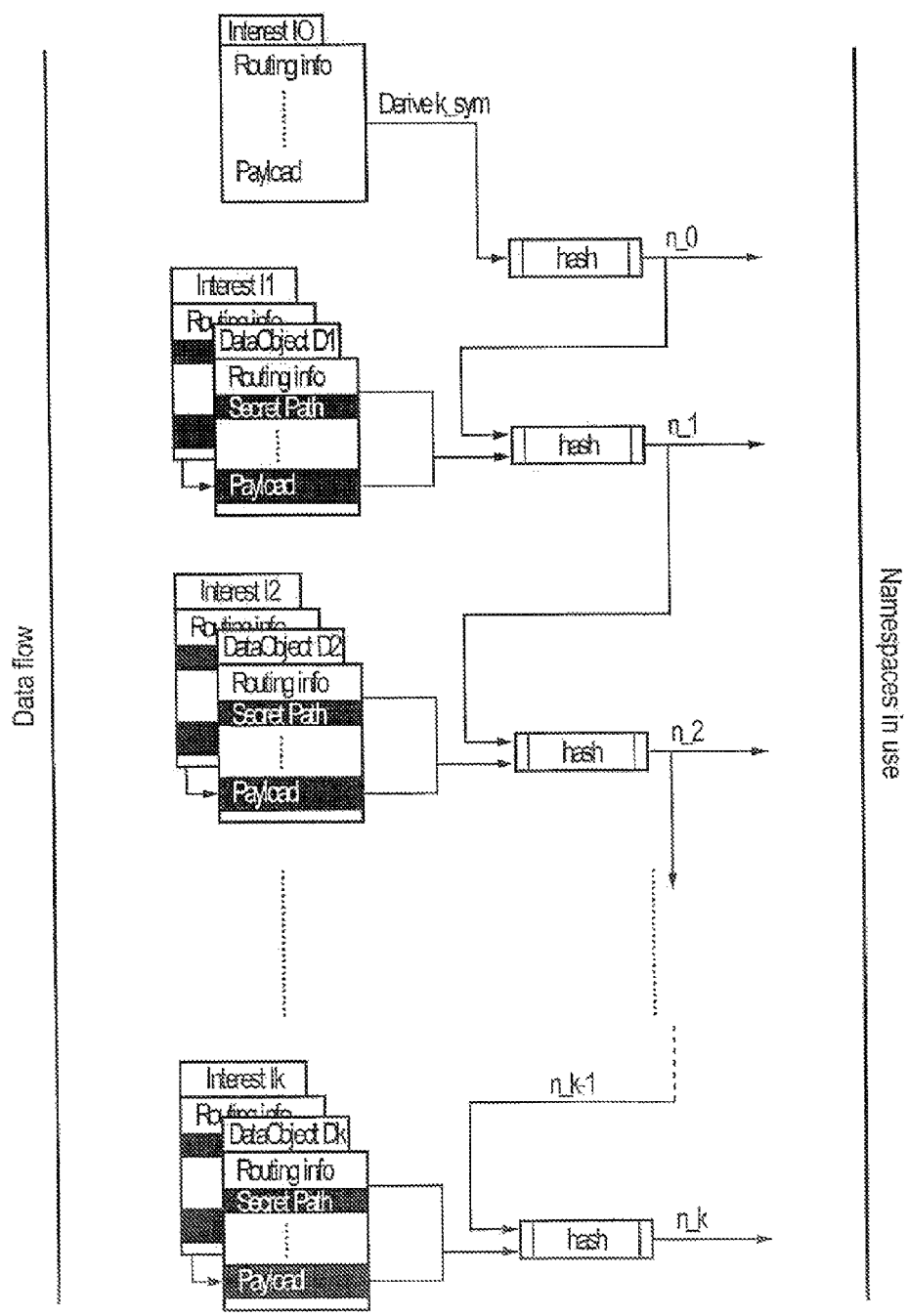
FIG. 4 illustrates a namespace daisy-chain according to one embodiment.

As shown in FIG. 4, this approach creates a namespace daisy-chain by hashing the encrypted traffic the end points are exchanging. Each namespace is single use and the evolution of the daisy-chain can only be predicted by the participating nodes. Typically, a secure session between end points in a content-centric network is established by first establishing a shared secret or encryption key between the end points. They then agree on a namespace within which the key is valid and all subsequent communication that takes place within that name space must use the shared key to encrypt and decrypt data. However, in embodiments, the client initiates a secure session establishment by issuing an interest packet, $I_0$ to the server. $I_0$ contains one half of a classic Diffie-Hellman handshake which is used to establish the shared secret (the cryptographic key) between the client and the server. The server then calculates the shared key, $k_{sym}$, and issues a data packet to the client with the information necessary to derive $k_{sym}$. However, it should be noted that $k_{sym}$ itself is never transmitted between the communicating parties which is a central concept in the Diffie-Hellman key exchange algorithm. Because $k_{sym}$ is only known to the client and server, it may be used to establish a namespace target for the next interest packet in the session. This is done by applying a known hash function, h( ) to $k_{sym}$. $H(k_{sym})$ produces a value $n_0$ of known length that is derived from $k_{sym}$, but from which $k_{sym}$ cannot be determined. The namespace target for the secure session is then established as /(server-name)/sec/$n_0$. Once again, as with $k_{sym}$, $n_0$ is only known to the server and client. However, it will be transmitted in clear text within the next interest packet $I_1$ issued by the client. This is necessary for the functioning of the routing protocols of the content-centric network and does not allow attackers to predict the next valid namespace for communication between the client and server.

When the server receives $I_1$, it will attempt to decrypt the encrypted segments of the packet with the key indicated by $I_1$'s target namespace. If it is a valid interest packet, the server will generate a data packet $D_1$ in response and send this to the client. As with $I_1$, $D_1$ has both encrypted (part of the namespace and the data payload) and unencrypted (the routing information) segments. When $D_1$ is ready for despatch from the server, the server will update the name space associated with the ongoing session. By using $n_0$ as the seed to h( ) and subsequently using it to hash the encrypted contents of $D_1$, a new hash value $n_1$ is created. The next time the client wishes to send an interest packet to the server, it will need to target /(server-name)/sec/$n_1$ instead of /(server-name)/sec/$n_0$.

By using this principle, a namespace sequence is generated $n_0, n_1, n_2 \ldots, n_k$ in which each individual namespace is valid only for a single transaction. Every $n_i$ in the sequence will be exposed in the clear only once, after which it becomes invalid for further use. Furthermore, no information exchange between the client and server will allow an eavesdropper to derive $n_{i+1}$ from the clear text in $n_i$. Only nodes in the possession of the session key, $k_{sym}$, and privy to all the previous messages exchanged between the client and server are able to derive the proper namespace sequence.

By utilising the fact that the client and server share the same key, $k_{sym}$, both end points can predict how the namespace evolves, as long as the communication between them is not disturbed. Thus, by being able to send an interest packet to /(server-name)/sec/$n_{k+1}$, the client implicitly verifies that it has received and decrypted everything (and nothing more) than the server has sent in the session up to and including $D_k$.

Such an approach of daisy-chaining hash values to evolve a secure session namespace provides many benefits. For example, unlike schemes with a fixed or predictable session identifier, final confirmation of the session establishment handshake cannot be performed by an intruder executing a replay attack. Also, an eavesdropper cannot correlate which data belongs to the same session. This is because there is no way for the eavesdropper to predict how the namespace evolves in a session because $n_{i+1}$ cannot be computed from $n_i$ without $k_{sym}$. Hence, it is not possible to determine whether two consecutive interest packets are part of the same session or different sessions. An intruder will, however, be able to tell whether or not an interest packet is part of some session. Also, if the data within the session is tampered with in any way (packets are injected, removed or altered), communication between the client and server will immediately fail and they will have to establish a new secure session to continue communication. This is in line with the routing principles of content-centric networks where any interest packet will elicit a single data packet in response and failure results in transmission of a new interest packet. However, one disadvantage with this approach is that it will be less suitable for use on transmission channels with high packet loss and/or packet corruption. This is because any failure will require the session to be re-established (including the overhead of the handshake) and high failure rates on the transmission media will degrade the performance of the protocol severely.

Hence, this approach provides additional data security compared to other known solutions by performing a de-correlation between related network packets transmitted in a high-throughput secure session between hosts in a content-centric network. The security provided is a key enabler for many commercial applications. This approach adds a layer of security to content-centric network sessions, without compromising other parts of the network security.

As can be seen in FIG. 4, the initial namespace, $n_0$, is generated from the shared secret. For each incoming Interest packet, the content provider returns a Data packet which includes both unencrypted (the routing information) and encrypted (the secret path and payload parts). Namespaces $n_k$, for k>0, are generated by hashing the previous namespace, $n_k-1$, and the encrypted parts of the response packet, $D_k$. Each namespace is valid only for a single use.

To further improve security, it will be appreciated that the data transmitted in the open between the client and server (such as the content identifier portion 22) may be subjected to 'salting' techniques well-known in the art to help mask that subsequent content identifier portions 22 are related and help increase decorrelation.

A person of skill in the art would readily recognise that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method of establishing a secure session for transfer of a stream of data packets between a client device and a server of a content-centric network, said method comprising the steps of:
    exchanging a first namespace portion indication between said server and said client device;
    deriving a first namespace portion by decrypting said first namespace portion indication;
    incorporating said decrypted first namespace portion into a first namespace of a first request from said client device to said server for a first data packet of said stream of data packets;
    deriving a namespace portion for a subsequent data packet, said subsequent namespace portion being based on a content of said first data packet, said subsequent namespace portion differing from said first namespace portion; and
    incorporating said subsequent namespace portion into a subsequent namespace of a subsequent request from said client device to said server for a subsequent data packet of said stream of data packets, wherein the namespace for each subsequent data packet is iteratively derived based on the preceding data packet for authentication between the client device and the server.

2. The method of claim 1, wherein said first namespace portion indication comprises an encryption key shared by said client and said server and said first namespace portion is derived from said encryption key.

3. The method of claim 1, wherein said first namespace portion indication comprises an encryption key shared by said client and said server and said first namespace portion is derived from a hash function shared by said client and said server which is applied to said encryption key.

4. The method of claim 1, wherein said first namespace portion indication comprises said first namespace portion which has been encrypted by an encryption key shared by said client and said server, and said first namespace portion is derived by both the client and the server by decrypting said first namespace portion indication using said encryption key.

5. The method of claim 1, wherein said subsequent namespace portion indication comprises said first data packet encrypted by an encryption key shared by said client and said server and said subsequent namespace portion is derived from said first data packet.

6. The method of claim 1, wherein said subsequent namespace portion is derived from one of said first data packet by decrypting said first data packet using an encryption key and from a hash function applied to said first data packet.

7. The method of claim 1, wherein said subsequent namespace portion is derived from a hash function applied to said first data packet and said first namespace portion.

8. The method of claim 1, wherein said first namespace portion comprises one of a random value and a selected value in a sequence of pseudorandom values.

9. The method of claim 1, wherein said subsequent namespace portion comprises one of another random value and another selected value in said sequence of pseudorandom values.

10. The method of claim 1, further comprising the steps of deriving subsequent namespace portions, said subsequent namespace portions differing from preceding namespace portions; and
    incorporating said subsequent namespace portions into a subsequent namespace of subsequent requests from said client to said server for subsequent data packets of said stream of data packets.

11. The method of claim 1, further comprising the step of, for namespaces of requests for subsequent data packets of said stream of data packets whose content identifier does not vary, applying a salt function shared by said client and said server to said content identifier to increase its variability.

12. A client device configured to establish a secure session for transfer of a stream of data packets between a server and said client device of a content-centric network, said client device comprising:
    exchanging logic configured, using a hardware processor, to exchange a first namespace portion indication between said server and said client device;
    deriving logic configured to derive a first namespace portion by decrypting said first namespace portion indication and to incorporate said decrypted first namespace portion into a first namespace of a first request to said server for a first data packet of said stream of data packets, said deriving logic being further operable to derive a namespace portion for a subsequent data packet from a preceding data packet, said subsequent namespace portion differing from said first namespace portion and to incorporate said subsequent namespace portion into a subsequent namespace of a subsequent request to said server for a subsequent data packet of said stream of data packets, wherein the namespace for each subsequent data packet is iteratively derived based on the preceding data packet for authentication between the client device and the server.

13. A method of establishing a secure session for transfer of a stream of data packets between a server and a client device of a content-centric network, said method comprising the steps of:
    exchanging a first namespace portion indication between said server and said client device;
    deriving a first namespace portion by decrypting said first namespace portion indication;
    incorporating said decrypted first namespace portion into a first namespace associated with a first data packet of said stream of data packets;
    deriving a namespace portion for a subsequent data packet, said subsequent namespace portion being based on a content of said first data packet, said subsequent namespace portion differing from said first namespace portion; and
    incorporating said subsequent namespace portion into a subsequent namespace associated with a subsequent data packet of said stream of data packets, wherein the namespace for each subsequent data packet is iteratively derived based on the preceding data packet for authentication between the client device and the server.

14. A server configured to establish a secure session for transfer of a stream of data packets between a server and a client device of a content-centric network, said server comprising:

exchanging logic configured, using a hardware processor, to exchange a first namespace portion indication between said server and said client device;
deriving logic configured to derive a first namespace portion by decrypting said first namespace portion indication;
incorporating logic configured to incorporate said decrypted first namespace portion into a first namespace associated with a first data packet of said stream of data packets;
said deriving logic being configured to derive a namespace portion for a subsequent data packet, said subsequent namespace portion being based on content of said first data packet, said subsequent namespace portion differing from said first namespace portion; and
said incorporating logic being configured to incorporate said subsequent namespace portion into a subsequent namespace associated with a subsequent data packet of said stream of data packets, wherein the namespace for each subsequent data packet is iteratively derived based on the preceding data packet for authentication between the client device and the server.

15. A non-transitory computer-readable storage device storing instructions computer program product configured, when executed by a hardware processor of a computing device, to perform the steps of:

exchanging a first namespace portion indication between a server and a client device;
deriving a first namespace portion by decrypting said first namespace portion indication;
incorporating said decrypted first namespace portion into a first namespace of a first request from said client device to said server for a first data packet of said stream of data packets;
deriving a namespace portion for a subsequent data packet, said subsequent namespace portion being based on a content of said first data packet, said subsequent namespace portion differing from said first namespace portion; and
incorporating said subsequent namespace portion into a subsequent namespace of a subsequent request from said client device to said server for a subsequent data packet of said stream of data packets, wherein the namespace for each subsequent data packet is iteratively derived based on the preceding data packet for authentication between the client device and the server.

* * * * *